(12) United States Patent
Shimodaira

(10) Patent No.: US 12,251,840 B2
(45) Date of Patent: Mar. 18, 2025

(54) FORCE CONTROL PARAMETER ADJUSTMENT METHOD AND FORCE CONTROL PARAMETER ADJUSTMENT APPARATUS

(71) Applicant: SEIKO EPSON CORPORATION, Tokyo (JP)

(72) Inventor: Yasuhiro Shimodaira, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 260 days.

(21) Appl. No.: 17/847,561

(22) Filed: Jun. 23, 2022

(65) Prior Publication Data

US 2022/0410384 A1  Dec. 29, 2022

(30) Foreign Application Priority Data

Jun. 24, 2021  (JP) .................................. 2021-104753

(51) Int. Cl.
*B25J 9/16* (2006.01)
*B25J 13/08* (2006.01)

(52) U.S. Cl.
CPC ........... *B25J 9/1633* (2013.01); *B25J 9/1651* (2013.01); *B25J 9/1653* (2013.01); *B25J 13/085* (2013.01)

(58) Field of Classification Search
CPC ...... B25J 9/1633; B25J 9/1653; B25J 13/085; G05B 2219/40032; G05B 2219/41021
See application file for complete search history.

(56) References Cited

U.S. PATENT DOCUMENTS

| | | | | |
|---|---|---|---|---|
| 6,140,788 A | * | 10/2000 | Watanabe | B25J 9/1687 318/568.22 |
| 2018/0200880 A1 | * | 7/2018 | Meissner | B25J 9/1656 |
| 2018/0222048 A1 | * | 8/2018 | Hasegawa | B25J 9/161 |
| 2018/0222057 A1 | * | 8/2018 | Mizobe | B25J 9/161 |
| 2018/0243899 A1 | * | 8/2018 | Hashimoto | B25J 9/1612 |

FOREIGN PATENT DOCUMENTS

| | | |
|---|---|---|
| JP | H01-146680 A | 6/1989 |
| JP | H10-207519 A | 8/1998 |
| WO | 2019-098044 A1 | 5/2019 |
| WO | 2020-255312 A1 | 12/2020 |

\* cited by examiner

*Primary Examiner* — Wade Miles
*Assistant Examiner* — Mohammed Yousef Abuelhawa
(74) *Attorney, Agent, or Firm* — Harness, Dickey & Pierce, P.L.C.

(57) ABSTRACT

A method includes a measurement step of producing measured force information of external force by causing a robot to perform an action using second servo gains adjusting force control parameters corresponding to first servo gains when the robot performs a regular task. The measured force information includes an action period of time during which the action is performed, a maximum detected force value of the external force, and a maximum detected torque value of the external force. The method further includes a parameter update step of producing a new candidate value of the force control parameters by carrying out an optimization process on the force control parameters by using the measured force information. The method further includes a parameter determination step of determining the force control parameters used in the force control performed by the robot by repeating the measurement step and the parameter update step.

6 Claims, 10 Drawing Sheets

FIG. 13

| GENER-ATION | NUMBER OF GROUPS | AVERAGE TASK PERIOD | MAXIMUM TASK PERIOD | MINIMUM TASK PERIOD | DIFFER-ENCE | MAXIMUM OBSERVED FORCE VALUE | MAXIMUM OBSERVED TORQUE VALUE | ASSESSED VALUE | REMARKS |
|---|---|---|---|---|---|---|---|---|---|
| 1 | 7 | 20.51 | 27.14 | 17.07 |  | 5.0 | 200.0 | 20.51 |  |
| 2 | 7 | 19.54 | 25.69 | 14.78 | -0.97 | 6.2 | 247.0 | 19.54 |  |
| 3 | 7 | 16.56 | 24.01 | 15.18 | -2.98 | 7.4 | 297.9 | 16.56 |  |
| 4 | 7 | 13.05 | 17.47 | 8.87 | -3.51 | 8.6 | 363.5 | 13.05 |  |
| 5 | 7 | 12.65 | 17.05 | 12.13 | -0.4 | 10.0 | 425.0 | 12.65 |  |
| 6 | 7 | 9.45 | 11.98 | 6.73 | -3.2 | 12.1 | 493.6 | 9.45 |  |
| 7 | 7 | 7.32 | 8.94 | 6.08 | -2.13 | 14.3 | 600.9 | 7.32 |  |
| 8 | 7 | 6.96 | 8.85 | 4.54 | -0.36 | 17.1 | 727.0 | 6.96 |  |
| 9 | 7 | 8.26 | 11.49 | 5.97 | 1.3 | 20.1 | 882.4 | 8.26 |  |
| 10 | 7 | 6.59 | 7.88 | 4.07 | -1.67 | 24.0 | 1023.3 | 204.07 |  |
| 11 | 7 | 6.74 | 8.38 | 4.42 | 0.15 | 24.2 | 1105.0 | 204.42 |  |
| 12 | 7 | 6.34 | 8.63 | 4.52 | -0.4 | 21.1 | 1046.0 | 104.52 |  |
| 13 | 7 | 6.43 | 8.24 | 5.08 | 0.09 | 22.5 | 940.0 | 6.43 |  |
| 14 | 7 | 6.37 | 8.30 | 4.38 | -0.06 | 21.5 | 976.0 | 6.37 | TERMINATE ADJUSTMENT |

FORCE CONTROL PARAMETER ADJUSTMENT METHOD AND FORCE CONTROL PARAMETER ADJUSTMENT APPARATUS

The present application is based on, and claims priority from JP Application Serial Number 2021-104753, filed Jun. 24, 2021, the disclosure of which is hereby incorporated by reference herein in its entirety.

BACKGROUND

1. Technical Field

The present disclosure relates to a force control parameter adjustment method and a force control parameter adjustment apparatus.

2. Related Art

There is a technology of related art for automatically setting parameters that specify the action of a robot. In the technology described in WO2019/098044A1, an action adjustment apparatus adjusts an action command value generated by a robot control apparatus in accordance with the result of detection performed by an external sensor and externally provided constraint conditions. The action command value is a position command value, a velocity command value, or an acceleration command value for an end effector at each point of time. The external sensor is a force sensor, a vision sensor, a tactile sensor, or a touch sensor. WO2019/098044A1 describes that control parameters may be adjusted instead of the action command value. The control parameters include a force control gain and an impedance parameter relating to force control, a gain and a visual impedance parameter relating to visual servo control, and a filter setting parameter used in feedback control.

In the force control, there is a trade-off between the velocity of the action of the robot and how easily oscillation occurs. That is, when the control parameters are so set that the velocity of the action of the robot increases, oscillation is likely to occur. On the other hand, when the control parameters are so set that the oscillation is unlikely to occur, the velocity of the action of the robot decreases. The control parameters in the force control are therefore set by a skilled operator who understands the velocity of the action of the robot and how easily oscillation occurs in relation to the numerical values of the force control parameters. There is a need for a technology that allows even inexperienced operators to set the control parameters in the force control.

SUMMARY

According to an aspect of the present disclosure, there is provided a method for adjusting one or more force control parameters used in force control performed by a robot system. The robot system includes a robot, a force detector configured to measure an external force exerted on the robot, and a control section that causes the robot to perform an action through feedback control. The adjustment method includes a measurement step of producing a measured force value that is a measured value of the external force by causing the robot to perform an action using one or more second servo gains corresponding to one or more first servo gains used by the control section when the robot system is caused to perform an actual task, the second servo gains each having a value greater than a value of the corresponding first servo gain, and further using a candidate value of the force control parameters, a parameter update step of producing a new candidate value of the force control parameters by carrying out an optimization process on the force control parameters by using the measured force value, and a parameter determination step of determining the force control parameters used in the force control performed by the robot system by repeating the measurement step and the parameter update step.

BRIEF DESCRIPTION OF THE DRAWINGS

FIG. 13 is a table showing transition of a task period and a measured force value in the processes in FIG. 6.

DESCRIPTION OF EXEMPLARY EMBODIMENTS

A. First Embodiment

Figure 1:
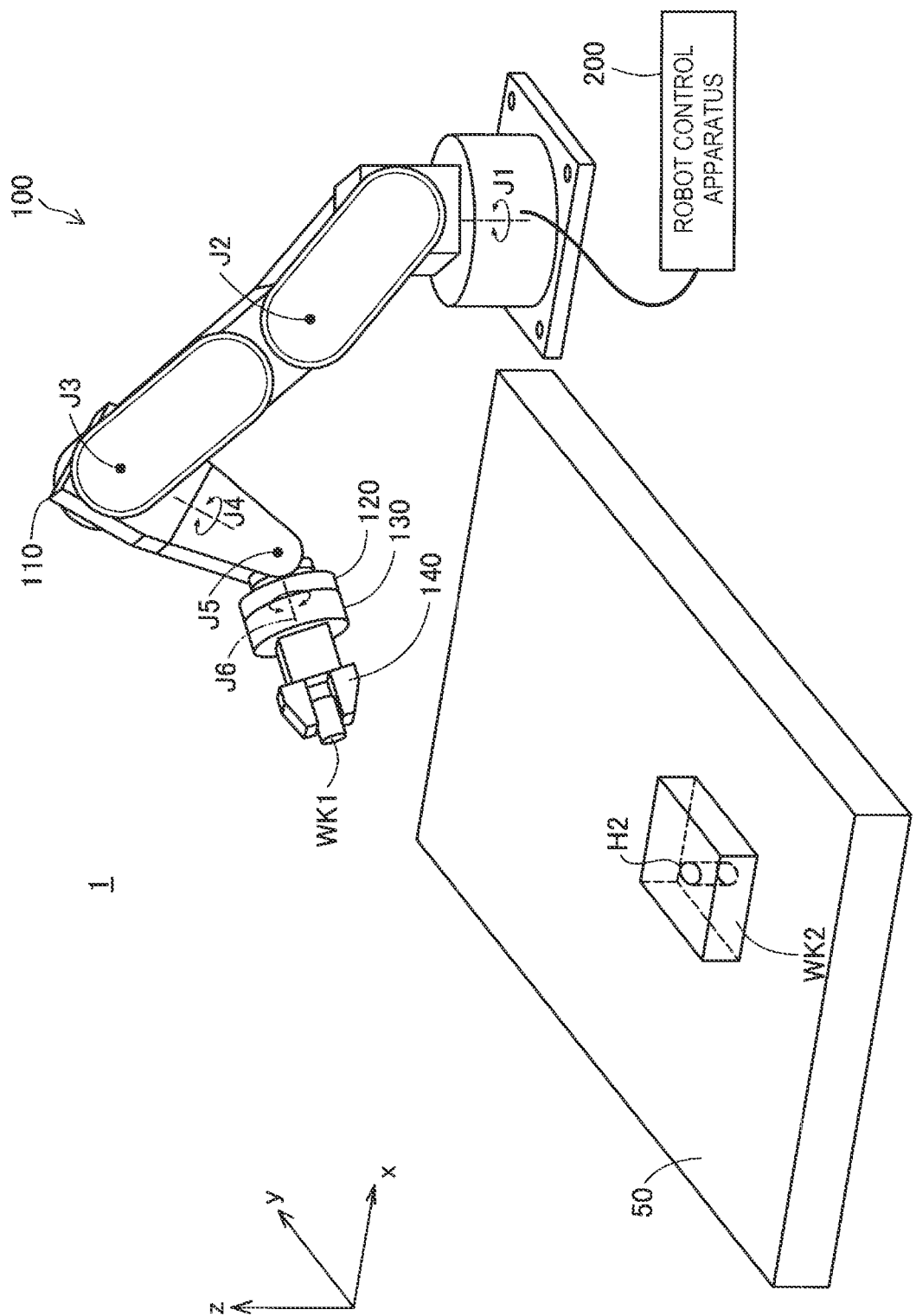
FIG. 1 is a perspective view showing a robot system according to an embodiment.

A1. Configuration of Robot System:

FIG. 1 is a perspective view showing a robot system 1 according to the embodiment. The robot system 1 includes a robot 100, a force detector 130, an end effector 140, and a robot control apparatus 200. The robot 100 and the robot control apparatus 200 are connected to each other in a communicable manner via cabled or wireless communication.

The robot 100 is a single-arm robot with any of a variety of end effectors to be used attached to an arm flange 120 at the front end of an arm 110.

The arm 110 includes six joints J1 to J6. The joints J2, J3, and J5 are bending joints, and the joints J1, J4, and J6 are torsional joints. The joints are each provided with a servomotor 150 and a position sensor 160. The servomotor 150 generates rotational output to drive the joint. The position sensor 160 detects the angular position of the output shaft of the servomotor 150. For ease of understanding the technology, neither the servomotor 150 nor the position sensor 160 is shown in FIG. 1.

Any of a variety of end effectors is attached to the arm flange 120 at the front end of the joint J6 to grip, process, or otherwise manipulate a target object. In the present specification, the target object handled by the robot 100 is also called a "workpiece".

The position in the vicinity of the front end of the arm 110 can be set as a tool center point. The tool center point is hereinafter called a "TCP". The TCP is a position used as a point of reference for the position of the end effector 140. For example, a predetermined position on the axis of rotation of the joint J6 can be set as the TCP.

The robot 100 can position the end effector in any position and in any posture within the range over which the arm 110 is movable. The force detector 130 and the end effector 140 are disposed at the arm flange 120. The end effector 140 is a gripper in the present embodiment.

The force detector 130 is provided as part of the robot 100 and can measure an external force exerted on the robot 100. The force detector 130 is specifically a six-axis sensor. The force detector 130 can detect the magnitudes of forces parallel to axes x, y, and z, which are perpendicular to one another in a sensor coordinate system, which is a unique coordinate system, and the magnitudes of torques around the three axes.

The coordinate system that defines the space in which the robot 100 is installed is called a "robot coordinate system. The robot coordinate system is a three-dimensional orthogonal coordinate system defined by the axes x and y, which are perpendicular to each other in a horizontal plane, and the axis z, the vertically upward direction of which is assumed to be a positive direction. The coordinate system shown in FIG. 1 is the robot coordinate system. Rx represents the angle of rotation around the axis x, Ry represents the angle of rotation around the axis y, and Rz represents the angle of rotation around the axis z. Any position in the three-dimensional space can be expressed in the form of positions on the axes x, y, and z, and any posture in the three-dimensional space can be expressed in the form of angles of rotation around the axes x, y, and z. The term "position" used in the present specification may also mean both a position and a posture. The term "force" used in the present specification may also mean both a force and a torque.

A workpiece WK2, which is a target manipulated by the robot 100, is placed on a worktable 50. A fitting hole H2 is formed via the upper surface of the workpiece WK2. The fitting hole H2 has a circular cross section, extends in the negative direction of the axis z from the opening at the upper surface of the workpiece WK2, and is a bottomed hole.

The end effector 140 is provided as part of the robot 100 and can hold a workpiece WK1. The workpiece WK1 is a cylindrical part. The outer diameter of the workpiece WK1 is slightly smaller than the inner diameter of the fitting hole H2. The end effector 140 can perform the task of fitting the workpiece WK1 gripped by the end effector 140 into the fitting hole H2 of the workpiece WK2.

The robot control apparatus 200 controls the arm 110 and the end effector 140. The robot control apparatus 200 can cause the robot 100 to perform a following action. The following action is generally an action that follows an external force. The following action in the present embodiment is more specifically an action of inserting a portion of the workpiece WK1 held by the end effector 140 into the fitting hole H2 formed in the workpiece WK2 with the portion being in contact with the workpiece WK2. The following action may include a time segment for which the workpiece WK1 separates from the workpiece WK2. In the following action performed by the robot 100, the robot control apparatus 200 performs force control on the robot 100 based on the value of an external force measured by the force detector 130.

Furthermore, the robot control apparatus 200 generates a control program in response to an instruction from an instructor. The robot control apparatus 200 further adjusts force control parameters used in the force control. The control program and force control parameters 226 generated by the robot control apparatus 200 are stored in a memory of the robot control apparatus 200.

Figure 2:
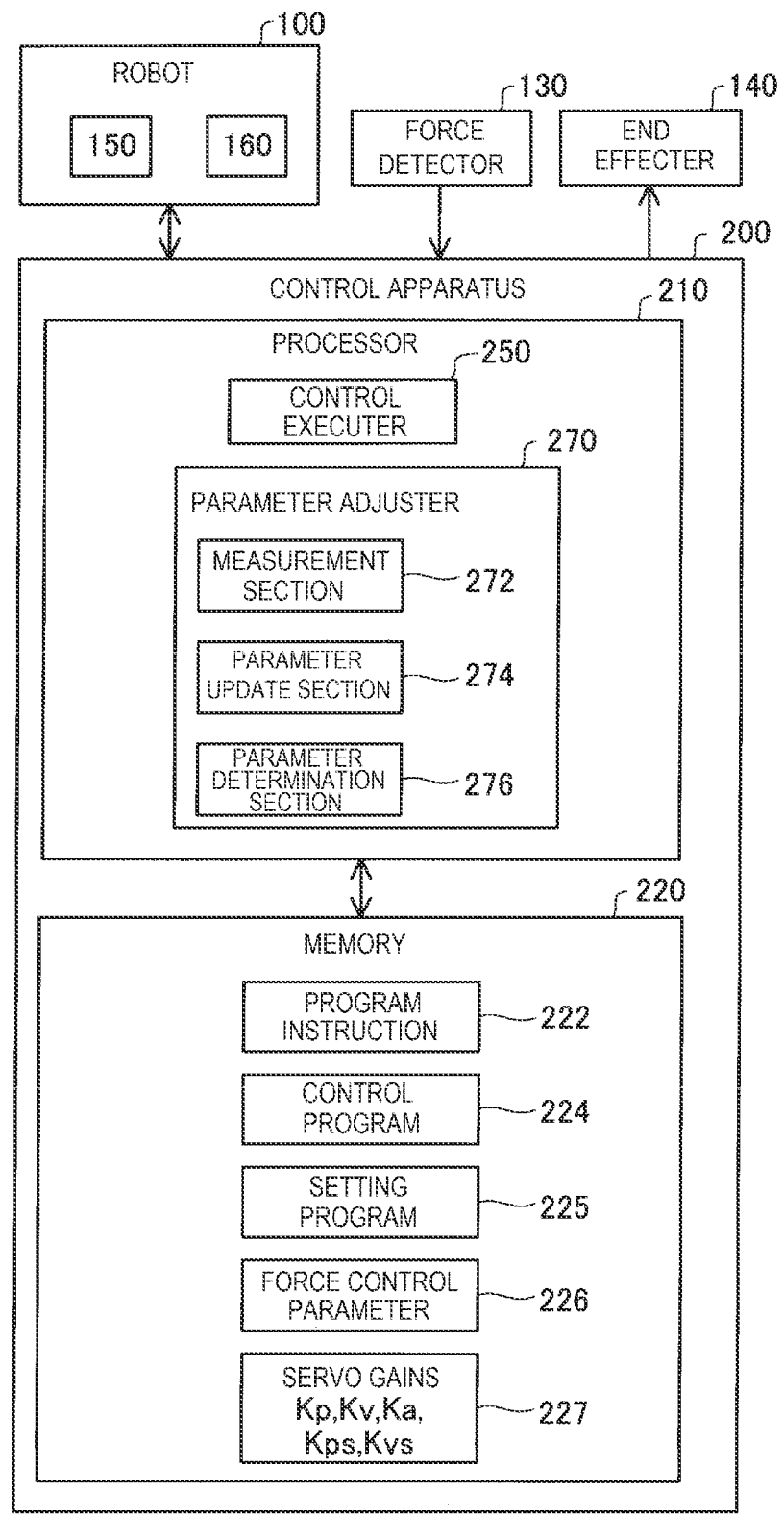
FIG. 2 is a block diagram showing the functions of a robot control apparatus.

FIG. 2 is a block diagram showing the functions of the robot control apparatus 200. The robot control apparatus 200 includes a processor 210 and a memory 220. The memory 220 includes a volatile memory and a nonvolatile memory. The processor 210 achieves a variety of functions by executing a program stored in the memory 220 in advance.

The processor 210 includes a control executor 250 as a functional section. The control executor 250 causes the robot 100 to perform an action by executing a program instruction 222 stored in the memory 220 in accordance with a control program 224 stored in the memory 220. The control executor 250 causes the robot 100 to perform an action by feedback control based on the output from the position sensor 160, the force detector 130, and other components.

The processor 210 includes a parameter adjuster 270 as a functional section. The processor 210 achieves the function as the parameter adjuster 270 by executing a setting program 225 stored in the memory 220 in advance. The parameter adjuster 270 determines parameters in the control program 224. The parameter adjuster 270 adjusts, for example, the force control parameters used in the force control performed by the robot system 1.

Figure 3:
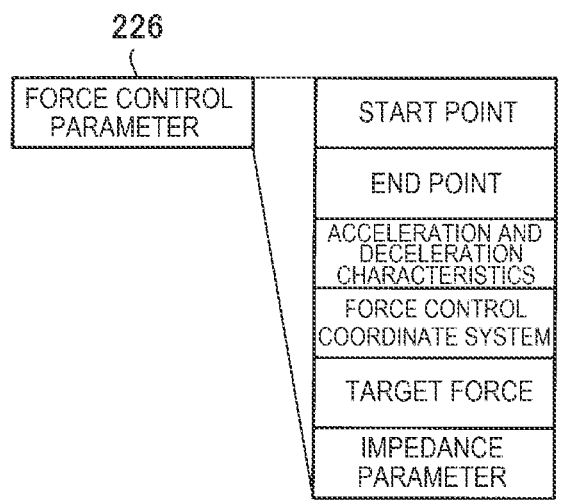
FIG. 3 shows force control parameters used in a control program.

FIG. 3 shows the force control parameters 226 used in the control program 224. The force control parameters 226 are parameters relating to the force control performed by the robot 100. The force control parameters 226 are used in the force control performed in accordance with the control program 224.

The force control parameters 226 include parameters representing a "start point" and an "end point" in each action (see upper portion of FIG. 3). In the present embodiment, the "start point" and the "end point" of a control point CP of the robot 100 under the control are defined in the robot coordinate system. Translational positions along the axes of the robot coordinate system and rotational positions around the axes thereof are defined. The start point and the end point may be defined in any of a variety of other coordinate systems.

In the force control, at least part of the start and end points is not defined in a single action in some cases. For example, when collision avoidance or following control is so performed that a force acting in a certain direction is reduced to zero in a certain action, the start and end points in the direction are not defined, but a state in which the position where the action is performed can arbitrarily change in such a way that the force in the direction becomes zero is defined in some cases.

The force control parameters 226 include "acceleration and deceleration characteristics" of the TCP in a plurality of actions (see middle portion of FIG. 3). The acceleration and deceleration characteristics specify the velocity of the TCP at each point of time as the TCP of the robot 100 moves from the start point to the end point of each action. In the present embodiment, the velocity specified by the acceleration and deceleration characteristics is the velocity of the TCP of the robot 100 under the control. In the present embodiment, the velocity of the TCP is defined in the robot coordinate system. That is, a translational velocity along each of the axes of the robot coordinate system and a rotational velocity or an angular velocity around each of the axes thereof are defined. The acceleration and deceleration characteristics may also be defined in any of a variety of other coordinate systems.

The force control parameters 226 include, as a parameter, information for identifying the coordinate system having an origin on which a target force in the force control acts and having one axis oriented in the direction of the target force, that is, a force control coordinate system (see middle portion of FIG. 3). The parameter can be defined in a variety of manners. For example, the parameter for identifying the force control coordinate system can be defined by data representing the relationship between the force control coordinate system and another coordinate system (such as robot coordinate system).

The force control parameters 226 include the "target force" (see lower portion of FIG. 3). The target force is a force instructed as a force that should act on an arbitrary point in variety of tasks, and is defined in the force control coordinate system. A target force vector representing the target force is defined as a base point of the target force vector and six-axis components starting from the base point, that is, translational forces along three axes and torques around the three axes, and is expressed in the force control coordinate system. Using the relationship between the force control coordinate system and another coordinate system allows the target force to be converted into a vector in any coordinate system, for example, the robot coordinate system.

The force control parameters 226 include an "impedance parameter" (see lower portion of FIG. 3). Impedance control is control in which virtual mechanical impedance is achieved by the driving force produced by the motor that drives each of the joints. In the impedance control, a virtual mass of the TCP is defined as a virtual mass coefficient m. Viscous resistance to which the TCP is virtually subjected is defined as a virtual viscosity coefficient d. The spring constant of the elastic force to which the TCP is subjected is defined as a virtual elastic modulus k. The impedance parameter is formed of the coefficients m, d, and k. The impedance parameter is defined for translation along each of the axes of the robot coordinate system and rotation around each of the axes thereof.

In the present embodiment, the target force and the impedance parameter can be set for each of a plurality of segments specified in accordance with the position of the control point in an action performed by the robot. As a result, the parameters are variable over time.

Figure 4:
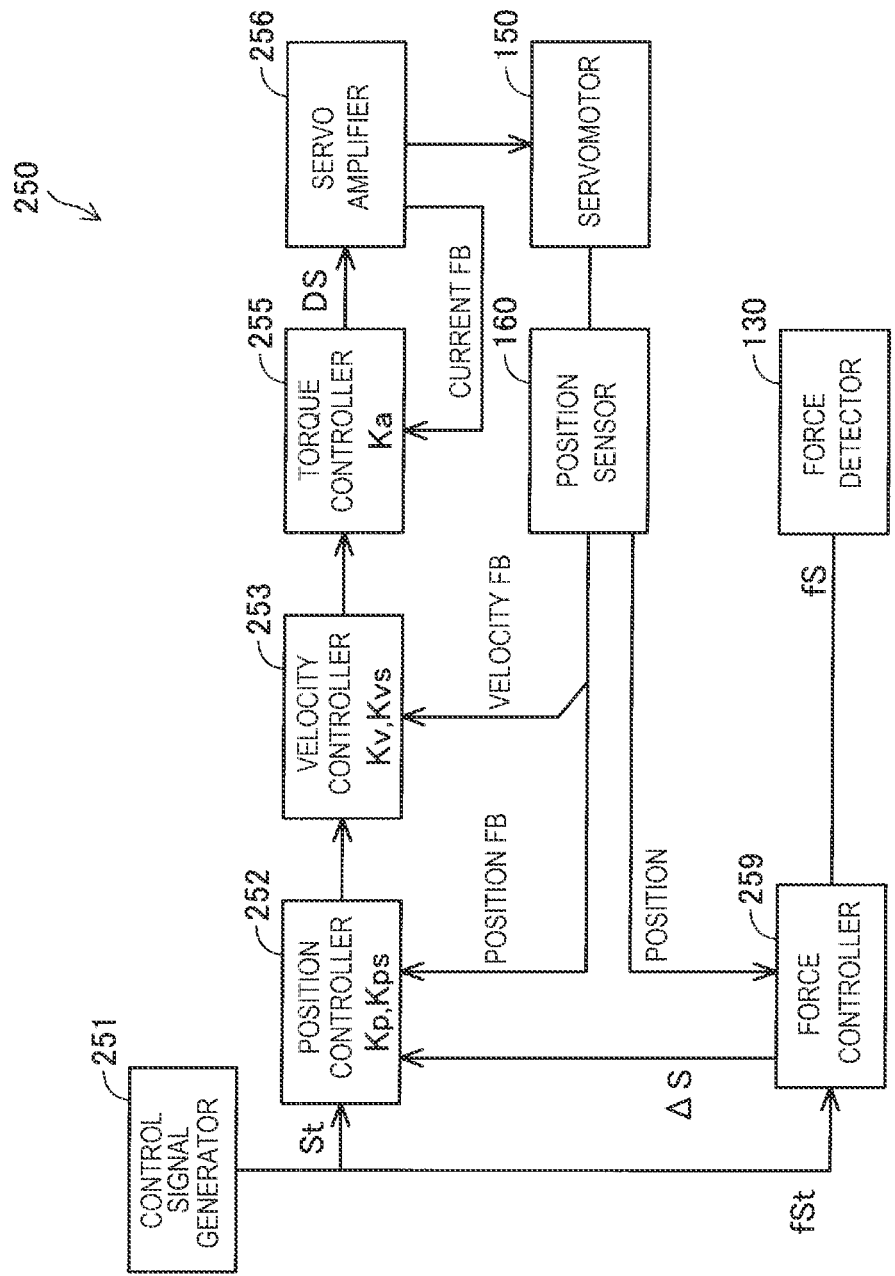
FIG. 4 is a block diagram showing the relationship between components of a control executor of the robot control apparatus and components provided in the robot.

FIG. 4 is a block diagram showing the relationship of components of the control executor 250 of the robot control apparatus 200 with the servomotor 150, the position sensor 160, and the force detector 130 provided in the robot 100. The control executor 250 performs feedback control on the position and velocity of the control point CP of the robot 100 and the current flowing through the control point CP.

The control executor 250 includes as components thereof a control signal generator 251, a position controller 252, a velocity controller 253, a torque controller 255, a servo amplifier 256, and a force controller 259. The control signal generator 251, the position controller 252, the velocity controller 253, the torque controller 255, and the force controller 259 are achieved by the processor 210 of the robot control apparatus 200.

The control signal generator 251 generates a position control signal representing a target position St, at which the end effector 140 should be positioned, and outputs the position control signal to the position controller 252. When the control signal generator 251 receives from a user a force control performing instruction, the control signal generator 251 generates a force control signal representing a target force fSt, that is, a force to be generated by the end effector 140 and the direction of the force, and a torque to be generated by the end effector 140 and the direction of the torque, and outputs the force control signal to the force controller 259.

The force controller 259 receives the force control signal, which represents the target force fSt, that is, a force to be generated by the end effector 140 and the direction of the force, and a torque to be generated by the end effector 140 and the direction of the torque, from the control signal generator 251. The force controller 259 receives, from the force detector 130, forces along the axes x, y, and z and the torques around the axes x, y, and z acting on the end effector 140. The forces along the axes x, y, and z and the torques around the axes x, y, and z acting on the end effector 140 are collectively denoted by fS in FIG. 4. The force controller 259 receives the rotational positions of the servomotors 150 from the position sensors 160 of the robot 100. The force controller 259 then determines the amount of positional correction ΔS based on the parameters described above and outputs a signal representing the amount of correction ΔS to the position controller 252.

The position controller 252 receives the position control signal representing the target position St from the control signal generator 251. The position controller 252 further receives the signal representing the amount of positional correction ΔS from the force controller 259. The position controller 252 further receives as position feedback the rotational positions of the servomotors 150 from the position sensors 160 of the robot 100. The position controller 252 calculates joint angles or joint displacements, which are appropriate solutions in inverse kinematics, based on the received information, generates a velocity control signal that controls the velocities of the servomotors 150 of the robot 100, and outputs the velocity control signal to the velocity controller 253.

The velocity control signal contains elements that are each a product of a coefficient Kp and a deviation of the rotational position of the servomotor 150, which is provided from the position sensor 160, from a target rotational position. The coefficient Kp is a servo gain in the position feedback. The servo gain Kp is stored in advance in the memory 220 of the robot control apparatus 200. In FIG. 2, the entire servo gains are collectively shown as servo gain 227 (see lower portion of FIG. 2).

In feedback control involving the force control, the servo gain in the position feedback is set at a value smaller than the servo gain in feedback control involving no force control. The same holds true for the servo gain in velocity feedback and the servo gain in current feedback. In the present embodiment, the following description will be made on the assumption that the feedback control involving the force control is performed.

When the position controller 252 has not received the force control performing instruction from the control signal generator 251, the position controller 252 does not take the information received from the force controller 259 into consideration when generating the velocity control signal.

The velocity controller 253 receives the velocity control signal from the position controller 252. The velocity controller 253 acquires as velocity feedback the rotational velocities of the servomotors 150 based on the information from the position sensors 160 of the robot 100. Based on that velocity control signal and the rotational velocities of the servomotors 150, the velocity controller 253 generates a torque control signal and outputs the torque control signal to the torque controller 255.

The torque control signal contains elements that are each a product of a coefficient Kv and a deviation of the rotational velocity of the servomotor 150 from a target rotational velocity. The coefficient Kv is a servo gain in the velocity feedback. The servo gain Kv is stored in advance in the memory 220 of the robot control apparatus 200 (see lower portion of FIG. 2).

The torque controller 255 receives the torque control signal from the velocity controller 253. The torque controller 255 further receives from the servo amplifier 256 a feedback signal representing the amounts of current supplied to the servomotors 150. The torque controller 255 determines the amounts of current to be supplied to the servomotors 150 based on the torque control signal and current feedback signals from the servomotors 150, and drives the servomotors 150 via the servo amplifier 256. Specifically, the torque controller 255 generates a drive signal DS, which drives the robot 100, based on the torque control signal and the current feedback signals from the servomotors 150.

The drive signal DS contains elements that are each a product of a coefficient Ka and a deviation of the rotational acceleration of the servomotor 150 from a target rotational acceleration. The coefficient Ka is a servo gain in the feedback on the amount of current. The coefficient Ka is also a servo gain in acceleration feedback.

Figure 5:
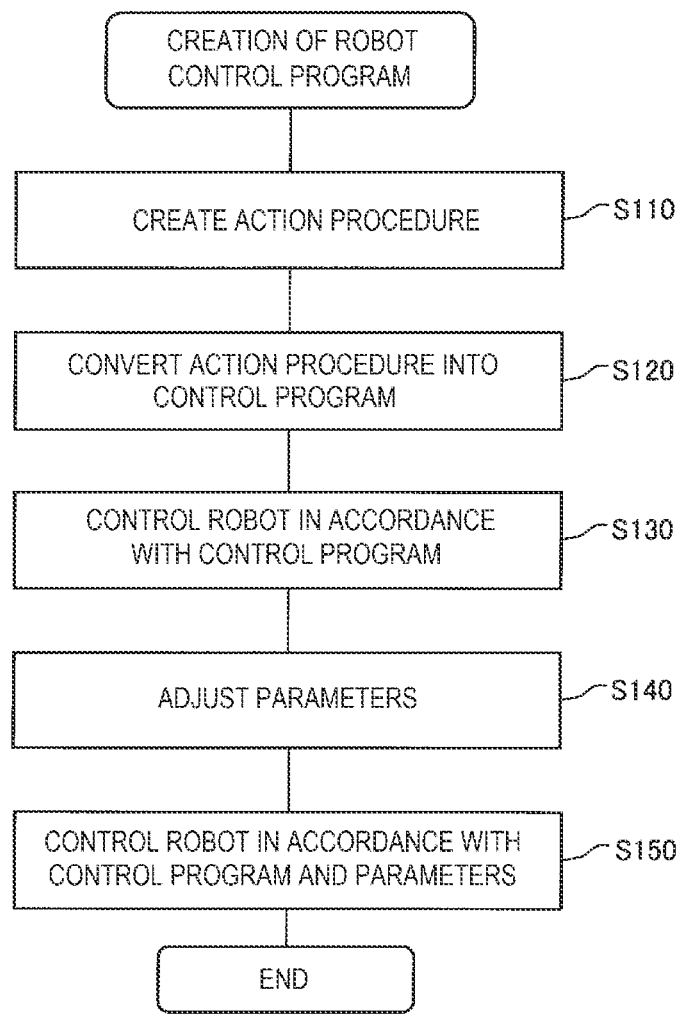
FIG. 5 is a flowchart showing the procedure of creation of the control program.

A2. Creation of Control Program and Adjustment of Parameters:

FIG. 5 is a flowchart showing the procedure of creation of the control program. In the present embodiment, the control program created by the processes shown in FIG. 5 is a program that achieves the following action of inserting the workpiece WK1 held by the end effector 140 into the fitting hole H2 provided in the workpiece WK2. The processes in FIG. 5 are carried out by the processor 210 of robot control apparatus 200.

In step S110, the procedure of actions of the robot 100 that are achieved by the control program 224 is created. Specifically, the actions to be performed by the robot 100 and the order in accordance with which the actions are performed are determined in accordance with operator's instructions inputted via a display apparatus and an input apparatus provided in the robot control apparatus 200.

In step S120, the action procedure determined in step S110 is converted into the control program. The converted control program is written in a low-level language. The control program is stored in the memory 220 (see 224 in FIG. 2).

In step S130, the robot control apparatus 200 controls the robot 100 in accordance with the control program 224 to cause the robot 100 to perform a task. The task can be performed as a checking task of checking the actions of the robot 100 in a production line. In the present embodiment, the action performed in step S130 is assumed to be an action performed while the robot control apparatus 200 controls the magnitude of a reaction force received by the robot 100 when a target object held by the robot 100 comes into contact with another member. Examples of the action may include insertion and assembly actions.

In step S140, the force control parameters used in the force control performed by the robot system 1 are adjusted. The adjustment of the force control parameters will be described later in detail.

In step S150, the robot control apparatus 200 controls the robot 100 in accordance with the control program 224 along with the force control parameters adjusted in step S140 to cause the robot 100 to perform a task. The task can be performed as a main task of manufacturing a product in the production line. In the present embodiment, the action performed in step S150 is assumed to be an action performed while the robot control apparatus 200 controls the magnitude of a reaction force received by the robot 100 when the target object held by the robot 100 comes into contact with another member. Examples of the action may include insertion and assembly actions.

Figure 6:
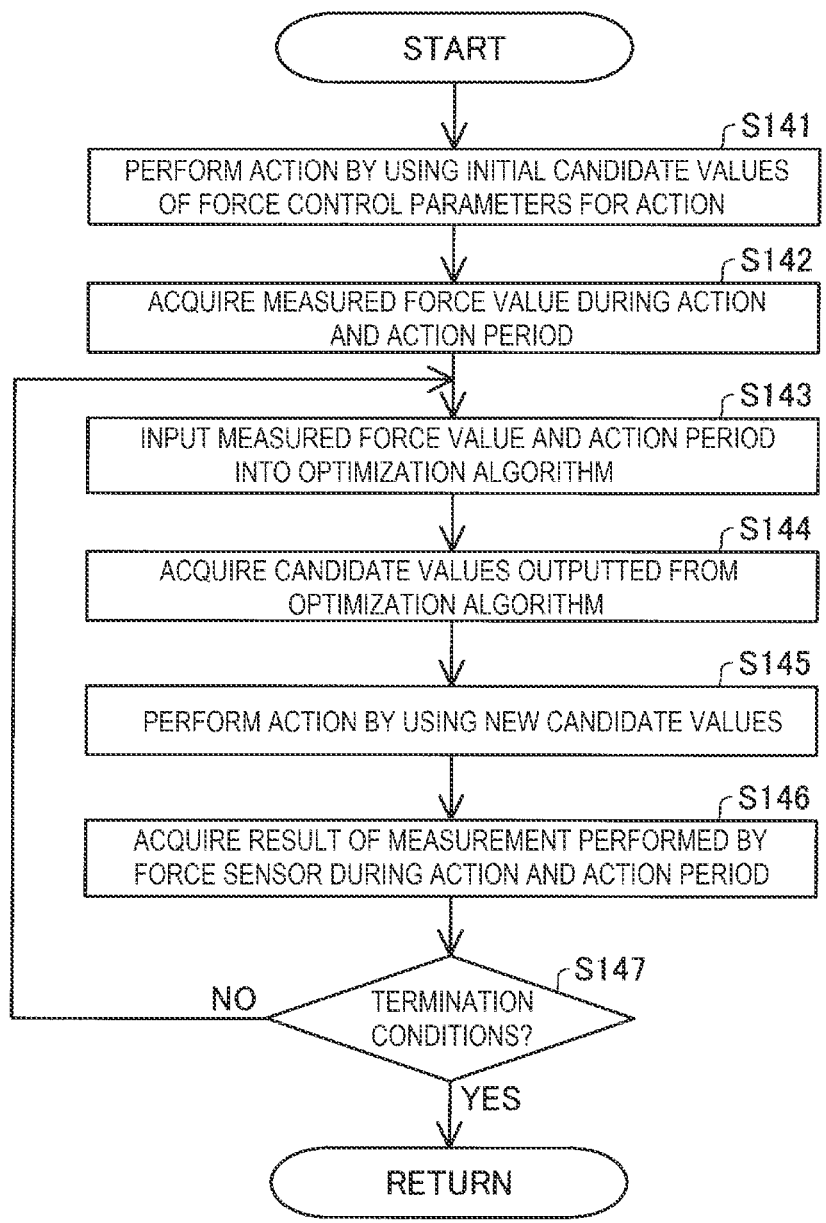
FIG. 6 is a flowchart showing a method for adjusting the force control parameters.

FIG. 6 is a flowchart showing a method for adjusting the force control parameters in step S140 in FIG. 5. The processes in FIG. 6 adjust the force control parameters used in the force control performed by the robot system 1. In the following description, the components of a target force Ft will be described along the axes x, y, and z of the robot coordinate system to facilitate understanding of the technology.

In step S141, the processor 210 of the robot control apparatus 200 uses the following action procedure determined in step S110 in FIG. 5 and initial candidate values of the force control parameters for the following action to cause the robot 100 to perform the following action. The initial candidate values of the force control parameters for the following action are not specified in accordance with a specific action, but are specified so as to be applicable to a variety of following actions. The initial candidate values of the force control parameters for the following action are stored in advance in the memory 220 of the robot control apparatus 200. In FIG. 2, the initial candidate values of the force control parameters for the following action and the force control parameters adjusted in step S140 are collectively shown as the force control parameters 226.

In the action in step S141, the control executor 250 of the processor 210 uses servo gains different from servo gains used by the control executor 250 when the robot system 1 is caused to perform an actual task in step S150 in FIG. 5 to cause the robot 100 to perform the action. The servo gains used in step S150 in FIG. 5 and the serve gains in step S141 in FIG. 6, which have values different from each other, are specifically the servo gain Kp for the position feedback and the servo gain Kv for the velocity feedback (see upper left portion of FIG. 4). As for the servo gain Ka for the current feedback, a common value is used in step S150 in FIG. 5 and step S141 in FIG. 6.

To distinguish the two kinds of servo gains from each other, the servo gains used by the control executor 250 when the robot system 1 is caused to perform an actual task while performing the force control in step S150 in FIG. 5 are called "first servo gains". The servo gains used in the action of adjusting the force control parameters in step S141 in FIG. 6 are called "second servo gains".

Second servo gains Kps and Kvs are servo gains corresponding to the first servo gains Kp and Kv, respectively, used by the control executor 250 when the robot system 1 is caused to perform an actual task in step S150 in FIG. 5. It is, however, noted that the second servo gains Kps and Kvs have values greater than the values of the corresponding first servo gains Kp and Kv. That is, the second servo gain Kps has a value greater than the value of the first servo gain Kp. The second servo gain Kvs has a value greater than the value of the first servo gain Kv. As a result, in the action in step S141, the robot system 1 is more responsive and oscillation is more likely to occur than when the robot system 1 is caused to perform an actual task. The second servo gains Kps and Kvs are stored in advance in the memory 220 of the robot control apparatus 200 (see lower portion of FIG. 2).

In step S142 in FIG. 6, the processor 210 of the robot control apparatus 200 acquires the value of a measured external force in the following action in step S141. The value of the measured external force is called a "measured force value". In step S142, the processor 210 of the robot control apparatus 200 further measures the period required for the following action in step S141. The period required for the following action is called an "action period". The process in step S142 is substantially carried out in parallel to the process in step S141. The processes in steps S141 and S142 are also collectively called a "measurement process". Steps S141 and S142 are also collectively called a "measurement step". FIG. 2 shows the functional section, of the processor 210, that carries out the processes in steps S141 and S142 as a "measurement section 272".

The following action performed by the robot 100 in step S141 in FIG. 6 is performed seven times. In step S142, the maximum of the values of the measured external force in the following action performed seven times is employed as the measured force value. The average of the periods required for the following action performed seven times is employed as the action period. After the measured force value as the maximum value and the action period as the average period are obtained, the processor 210 proceeds to the process in step S143.

In step S143, the processor 210 of the robot control apparatus 200 inputs the measured force value and the action period to an optimization algorithm. The optimization algorithm outputs new candidate values of the force control parameters by performing an optimization process on the force control parameters by using the measured force value and the action period (see FIG. 3). Processes carried out in accordance with the optimization algorithm will be described later.

In step S144 in FIG. 6, the processor 210 of the robot control apparatus 200 acquires new candidate values of the force control parameters outputted from the optimization algorithm. The processes in steps S143 and S144 are also collectively called a "parameter update process". Steps S143 and S144 are also collectively called a "parameter update step". FIG. 2 shows the functional section, of the processor 210, that carries out the processes in steps S143 and S144 as a "parameter update section 274".

In step S145 in FIG. 6, the processor 210 of the robot control apparatus 200 uses the following action procedure determined in step S110 and the new candidate values of force control parameters acquired in step S144 to cause the robot 100 to perform the following action. Also in the action in step S145, the control executor 250 of the processor 210 uses the second servo gains Kps and Kvs to cause the robot 100 to perform the action. As for the servo gain Ka for the current feedback, a common value is used in step S150 in FIG. 5 and step S146 in FIG. 6. The process in step S145 is the same as the process in step S141 except that the candidate values of the force control parameters are different between the two steps.

In step S146, the processor 210 of the robot control apparatus 200 acquires a measured force value in the following action in step S145. In step S146, the processor 210 of the robot control apparatus 200 further measures the action period for which the following action in step S145 is performed. The process in step S146 is substantially carried out in parallel to the process in step S145. The process in step S146 is the same as the process in step S142. The processes in steps S145 and S146 are also collectively called a "measurement process". Steps S145 and S146 are also collectively called a "measurement step". The functional section, of the processor 210, that carries out the processes in steps S145 and S146 is the measurement section 272 (see FIG. 2).

The following action performed by the robot 100 in step S145 is also performed seven times. In step S146, the maximum of the values of the measured external force in the following action performed seven times is employed as the measured force value. The average of the periods required for the following action performed seven times is employed as the action period. After the measured force value as the maximum value and the action period as the average period are obtained, the processor 210 proceeds to the process in step S147.

In step S147, the processor 210 of the robot control apparatus 200 evaluates whether or not an assessed value of each of the candidate values of the force control parameters satisfies termination conditions. When the result of the evaluation shows that the assessed values satisfy the termination conditions, the processes in FIG. 6 are terminated. When the result of the evaluation shows that the assessed values do not satisfy the termination conditions, the processor 210 returns to the process in step S143.

In step S147, an assessed value Eval of each of the candidate values of the force control parameters is calculated by Expression (1) below. The second and third terms in Expression (1) are each what is called a penalty term.

$$\text{Eval} = \alpha \times OT + \beta \times [\text{if}(F\text{max} > F\text{limit}), \text{then } 100] + \gamma \times [\text{if}(T\text{max} > F\text{limit}), \text{then } 100] \quad (1)$$

OT: Action period for which following action is performed

Fmax: Magnitude of maximum detected force Fd detected during following action
  in which the detected force Fd is a resultant force of the components along the axes x, y, and z Flimit: Acceptable magnitude of maximum detected force Fd Tmax: Magnitude of maximum detected torque Td detected during following action
  in which the detected torque Td is a resultant torque of the components around the axes x, y, and z Tlimit: Acceptable magnitude of maximum detected torque Td α, β, γ: Weight coefficients The termination conditions in step S147 are that the following two conditions are satisfied:

(c1) The latest assessed value is smaller than both β×100 and γ×100.

(c2) The condition indicating that the magnitude of the absolute value of the difference in the average task period between the current and previous generations is smaller than or equal to a threshold Dth is satisfied for N consecutive generations (N is an integer greater than or equal to 2).

The situation in which the condition (c1) is satisfied means that the maximum value Fmax of the detected force Fd does not exceed the acceptable value Flimit and the maximum value Tmax of the detected torque Td does not exceed the acceptable value Tlimit. The condition described above is imposed when the maximum value Fmax of the detected force Fd is not required to be minimized and the maximum value Tmax of the detected torque Td is not required to be minimized.

The situation in which the condition (c2) is satisfied means that the assessed value is unlikely to be improved by repeating steps S143 to S147 any further.

The processor 210 of the robot control apparatus 200 determines the force control parameters to be used in the force control performed by the robot system 1 by repeating steps S143 to S146. The processes in steps S143 to S147 are also collectively called a "parameter determination process". Steps S143 to S147 are also collectively called a "parameter determination steps". FIG. 2 shows the functional section, of the processor 210, that carries out the processes in steps S143 to S147 as a "parameter determination section 276". The determined force control parameters are stored in the memory 220 of the robot control apparatus 200 (see 226 in FIG. 2).

In the present embodiment, in the adjustment of the force control parameters in step S140 in FIG. 5, the robot 100 is caused to perform an action by using the second servo gains Kps and Kvs, which are more likely to cause oscillation than the first servo gains Kp and Kv in the actual task in step S150 (see S141 and S145 in FIG. 6). The force control parameters are then adjusted based on the provided measured force value (see S144 in FIG. 6). A situation in which oscillation is unlikely to occur in the actual task can therefore be ensured in advance by setting the second servo gains Kps and Kvs. That is, setting the second servo gain Kps, which is used in the force control parameter adjustment, at a value greater than the first servo gain Kp allows oscillation to be less likely to occur in the actual task using the adjusted force control parameters. Similarly, setting the second servo gain Kvs at a value greater than the first servo gain Kv allows oscillation to be less likely to occur in the actual task using the adjusted force control parameters. Therefore, even operators who have little experience and do not understand the relationship between the velocity of the action of the robot and how easily oscillation occurs in relation to the numerical values of force control parameters can appropriately set force control parameters that are unlikely to cause oscillation.

Figure 7:
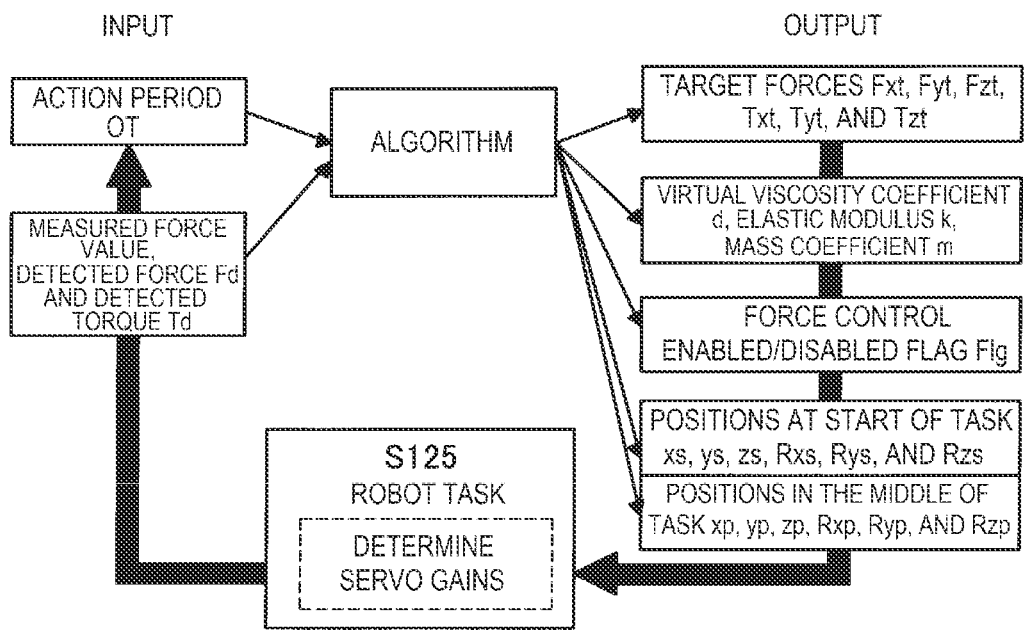
FIG. 7 is a block diagram showing the input and output to and from an optimization algorithm used in a parameter update process in steps S143 and S144 in FIG. 6.

FIG. 7 is a block diagram showing the input and output to and from the optimization algorithm used in the parameter update process in steps S143 and S144 in FIG. 6. The optimization algorithm used in the present embodiment is an algorithm using a measured force value and an action period as the input and candidate values of the force control parameters as the output. The optimization algorithm used in the present embodiment is specifically covariance matrix adaptation evolution strategy (CMA-ES).

The optimization algorithm receives input of the action period OT, the detected force Fd and the detected torque Td, the latter two of which form a measured force value (see left portion of FIG. 7). The optimization algorithm outputs candidate values of the force control parameters (see right portion of FIG. 7). The optimization algorithm performs the optimization process in such a way that the assessed value Eval specified by Expression (1) described above decreases.

The configuration described above along with the optimization process in consideration of the measured force value and the action period in the parameter update process in steps S143 and S144 in FIG. 6 can provide new candidate values of the force control parameters. Performing the force control using the force control parameters determined by the processes in FIG. 6 therefore allows the robot 100 to appropriately insert the workpiece WK1 into the fitting hole H2 in a motion highly assessed in terms of external forces received by the robot 100 in the following action and the action period OT for which the following action is performed.

The force control parameter candidate values outputted by the optimization algorithm include the target force Ft and the impedance parameter in the following action (see upper right portion of FIG. 7 and lower portion of FIG. 3). The target force Ft is expressed by a force component Fxt along the axis x, a force component Fyt along the axis y, a force component Fzt along the axis z, a torque component Txt around the axis x, a torque component Tyt around the axis y, a torque component Tzt around the axis z. The impedance parameter includes the virtual mass coefficient m, the virtual viscosity coefficient d, and the virtual elastic modulus k for each of the axes x, y, and z.

The optimization algorithm outputs a flag Flg, which specifies whether the force control is enabled or disabled, positions xs, ys, zs, Rxs, Rys, and Rzs of the end effector 140 at the start of the following action, and positions xp, yp, and zp, or Rxp, Ryp, and Rzp of the end effector 140 at a specified point of time between the start and end of the following action (see lower right portion of FIG. 7). The position of the end effector 140 in the present embodiment is the position of the TCP set in the vicinity of the front end of the end effector 140.

Performing the force control using the force control parameters determined by the process described above allows appropriately specified control of whether the force control is enabled or disabled and the position of the end effector 140 at the start of the following action and at the point through which the end effector 140 performing the following action passes, whereby the robot 100 can appropriately insert the workpiece WK1 into the fitting hole H2.

For example, the workpiece WK1 can be appropriately inserted into the fitting hole H2 without the force control in some cases when the hardware configuration of the robot 100 bends. The force control can be omitted in such a case by configuring the optimization process to include the flag Flg, which specifies whether the force control is enabled or disabled for each of the position-related three axes and the rotation-related three axes.

In addition to the parameters shown in FIG. 7, the optimization algorithm can also output the acceleration and deceleration characteristics, which are one of the force control parameters, and the force control coordinate system (see FIG. 4).

A3. Example of Following Action:

An example of the following action will be described below. The task described below is a snapping task. The following action is achieved by the force control performed by the robot control apparatus 200.

Figure 8:
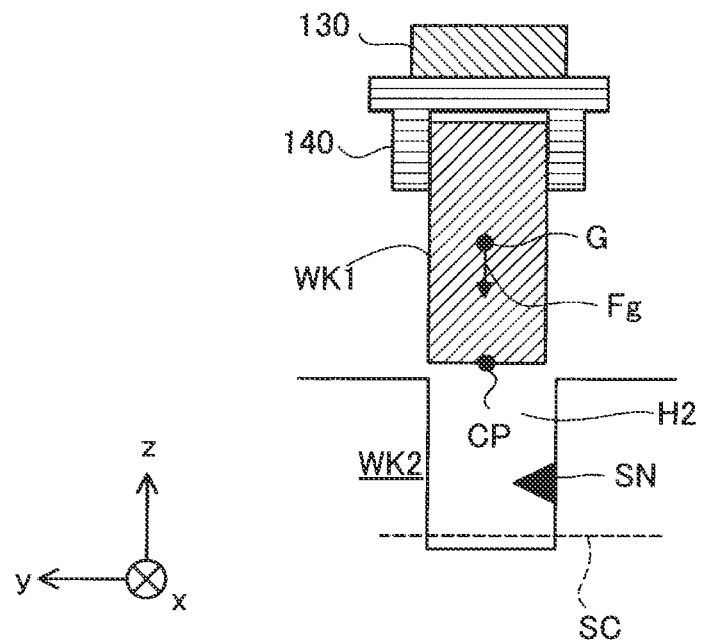
FIG. 8 is a descriptive diagram showing the state at the start of a following action in step S150.

FIG. 8 is a descriptive diagram showing the state at the start of the following action in step S150. To facilitate understanding of the technology, the contents of the technology will be described in accordance with the robot coordinate system rather than the sensor coordinate system. The direction of the insertion in the following action is the negative direction of the axis z in the robot coordinate system (see H2 in FIG. 1). It is noted that FIGS. 8 to 10 do not accurately show the shapes of the workpieces WK1 and WK2, the end effector 140, and the force detector 130.

A snapping mechanism SN is provided at a portion of the inner surface of the fitting hole H2 of the workpiece WK2, the portion facing the positive direction of the axis y. A claw-shaped protrusion of the snapping mechanism SN is pressed by a spring in the negative direction of the axis y and protrudes from the inner surface of the fitting hole H2 by a dimension specified in advance. When pressed in the positive direction of the axis y, the claw-shaped protrusion of the snapping mechanism SN moves out of the fitting hole H2 in the positive direction of the axis z. The claw-shaped protrusion of the snapping mechanism SN can retract in the positive direction of the axis y to the position where the claw-shaped protrusion does not protrude from the inner surface of the fitting hole H2.

The control point CP of the robot 100 is located at the center of the front end surface of the workpiece WK1 held by the end effector 140. A virtual threshold plane SC is defined in the vicinity of an end of the fitting hole H2, the end facing the insertion direction. The threshold plane SC is a plane parallel to the axes z and x. In the following action, when the control point CP reaches the threshold plane SC, it is determined that the following action is complete. The action period OT, for which the following action is performed, ranges from the point of time when the force control starts to the point of time when the control point CP reaches the threshold plane SC.

In the state shown in FIG. 8, a gravitational force Fg acts on the workpiece WK1. In the state shown in FIG. 8, the robot 100 performs the force control to maintain the position and posture of the workpiece WK1 against the gravitational force Fg acting on the workpiece WK1. The position and the posture of the workpiece WK1 at this point of time is a position and a posture that cause the area occupied by workpiece WK1 to fall within the area occupied by the fitting hole H2 of the workpiece WK2 when projected in the axis-z direction, which is the insertion direction.

Figure 9:
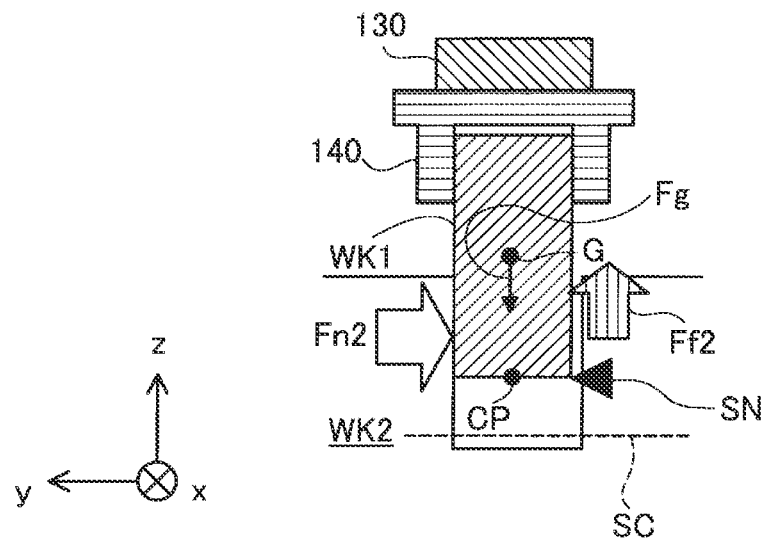
FIG. 9 is a descriptive diagram showing the state in the middle of the following action in step S150.

FIG. 9 is a descriptive diagram showing the state in the middle of the following action in step S150. In the state shown in FIG. 9, a front end of the workpiece WK1, the front end facing the negative direction of the axis y, is in contact with the claw-shaped protrusion of the snapping mechanism SN. A surface of the workpiece WK1, the surface facing the positive direction of the axis y, is in contact with the inner surface of the fitting hole H2.

In this state, the workpiece WK1 presses the claw-shaped protrusion of the snapping mechanism SN in the negative direction of the axis y and therefore receives a reaction force in the positive direction of the axis y from the claw-shaped protrusion of the snapping mechanism SN. The workpiece WK1 presses the inner surface of the fitting hole H2 in the negative direction of the axis z and therefore receives a vertical reaction force Fn2 in the positive direction of the axis y from the inner surface of the fitting hole H2. Furthermore, the workpiece WK1 being moved in the negative direction of the axis z by the robot 100 performing the following action receives a frictional force in the positive direction of the axis z from the surface where the workpiece WK1 is in contact with the inner surface of the fitting hole H2. In FIG. 9, the forces in the axis-z direction that the workpiece WK1 receives from the workpiece WK2 are collectively shown as a force Ff2.

Figure 10:
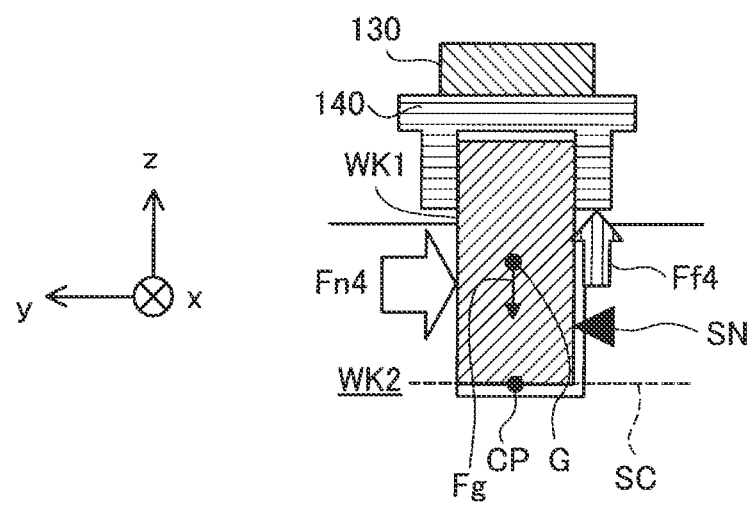
FIG. 10 is a descriptive diagram showing the state immediately before the following action in step S150 is completed.

FIG. 10 is a descriptive diagram showing the state immediately before the following action in step S150 is completed. In the state shown in FIG. 10, a front end of the workpiece WK1, the front end facing the negative direction of the axis y, has reached the threshold plane SC (see CP in FIG. 10). When sensing that the TCP has reached the threshold plane SC, the robot control apparatus 200 terminates the following action.

In FIG. 10, the forces in the axis-z direction that the workpiece WK1 receives from the workpiece WK2 including the claw-shaped protrusion of the snapping mechanism SN are collectively shown as a force Ff4 at the top of the workpiece WK1. In FIG. 10, the vertical reaction force which acts in the positive direction of the axis z and which the workpiece WK1 receives from the inner surface of the fitting hole H2 is shown as a force Fn4.

When the following action is completed, the gripper as the end effector 140 releases the workpiece WK1, and the robot 100 transitions to the next action.

Figure 11:
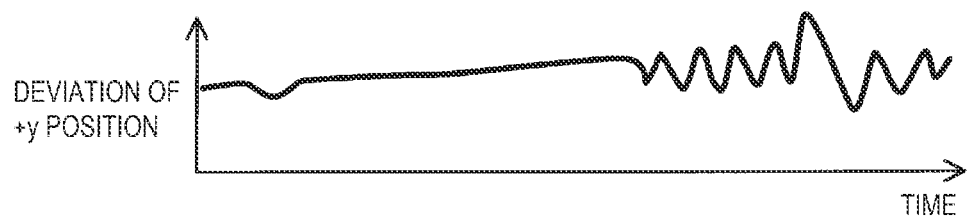
FIG. 11 is a graph showing positional deviation of a control point in the axis-y direction during the following action.

FIG. 11 is a graph showing positional deviation of the control point CP in the axis-y direction during the following action. The horizontal axis represents time. The robot control apparatus 200 sets target positions on the axes in a time sequential manner in the following action. The graph in FIG. 11 shows the deviation of the position of the control point CP in the axis-y direction from the target position in the following action. In the following action shown in FIGS. 8 to 10, the positional deviation of the control point CP in the axis-y direction changes as shown in FIG. 11. The positional deviation is maximized immediately after the control point CP, which is located at the front end surface of the workpiece WK1, passes through the position of the apex of the claw-shaped protrusion of the snapping mechanism SN (see FIG. 9).

Figure 12:
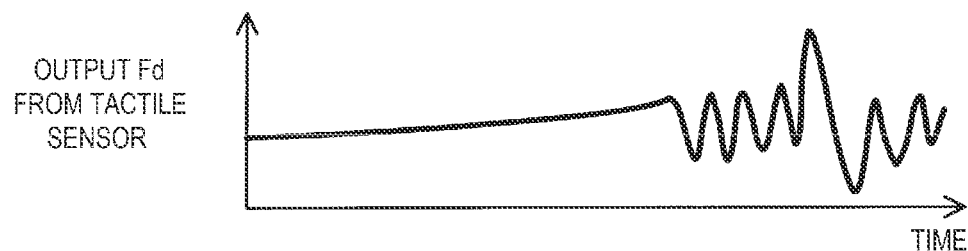
FIG. 12 is a graph showing a detected force that an end effector receives in the following action.

FIG. 12 is a graph showing the detected force Fd, which the end effector 140 receives in the following action. The horizontal axis represents time. The robot control apparatus 200 sets target forces along the axes in a time sequential manner in the following action. In the following action shown in FIGS. 8 to 10, the detected force Fd, which is the resultant force actually received by the end effector 140 along the axes, changes as shown in FIG. 12. The detected force Fd gradually increases after the start of the action. The reason for this is that the frictional force which acts in the positive direction of the axis z and which the workpiece WK1 receives from the inner surface of the fitting hole H2 with which the workpiece WK1 is in contact increases as the insertion advances. The detected force Fd is maximized when the control point CP, which is located at the front end surface of the workpiece WK1, is located in a position immediately before the apex of the claw-shaped protrusion of the snapping mechanism SN (see FIG. 9).

FIG. 13 is a table showing transition of the task period and the measured force value in the processes in FIG. 6. The task period and the measured force value are repeatedly acquired in the processes in steps S142 and S146 in FIG. 6. The task period and the measured force value acquired in step S142 are the task period and the measured force value in the action performed in accordance with the initial candidate values of the force control parameters. The task period and the measured force value acquired in step S146 are the task period and the measured force value in the action performed in accordance with the candidate values of the force control parameters acquired in step S144 carried out immediately before step 146.

In the example in FIG. 13, $\alpha=\beta=\gamma=1$, Flimit=23.0, and Tlimit=1000 in Expression (1) described above. In (c2) out of the termination conditions in step S147 in FIG. 6, Dth=0.5 and N=4.

In the leftmost column of the table in FIG. 13, the number of reiterations of steps S142 and S146 in FIG. 6 is labeled as "generation". "Generation" means the generation of the candidate values of the force control parameters acquired in step S144.

The second column counted from the leftmost column of the table in FIG. 13 shows the number of groups. The "number of groups" is the number of actions performed in steps S141 and S145 in FIG. 6. In steps S141 and S145, the following action performed by the robot 100 is performed seven times, as described above. The number of groups is therefore seven in each generation.

The third to fifth columns counted from the leftmost column of the table in FIG. 13 show the average, maximum, and minimum of the task period required for the seven actions and acquired in steps S142 and S146 in FIG. 6.

The sixth column counted from the leftmost column of the table in FIG. 13 shows the difference from the preceding-generation average of the task period required for the seven actions and acquired in steps S142 and S146 in FIG. 6. FIG. 13 shows that up to the eighth generation, the value of the difference is negative and the average of the task period is improved.

The seventh column counted from the leftmost column of the table in FIG. 13 shows the maximum force observed in the seven actions and acquired in steps S142 and S146 in FIG. 6. The eighth column counted from the leftmost column of the table in FIG. 13 shows the maximum torque observed in the seven actions and acquired in steps S142 and S146.

The ninth column counted from the leftmost column of the table in FIG. 13 shows the assessed value Eval of the candidate values of any of the force control parameters in each generation (see Expression (1) shown above).

In step S147 in FIG. 6, the processor 210 of the robot control apparatus 200 evaluates whether or not the assessed value of each of the candidate values of the force control parameters satisfies termination conditions, as described above. In the example shown in FIG. 13, the termination conditions are specifically that the following two conditions are satisfied:

(c1e) The latest assessed value is smaller than 100.

(c2e) The condition indicating that the magnitude of the absolute value of the difference in the average task period from the previous generation is smaller than or equal to 0.5 is satisfied for four consecutive generations.

In the example shown in FIG. 13, the adjustment of force control parameters has been terminated because the termination conditions (c1) and (c2) described above are satisfied in the 14th generation (see lower right portion of FIG. 13).

In the present embodiment, in the adjustment of the force control parameters in step S140 in FIG. 5, the robot 100 is caused to perform an action by using the second servo gains Kps and Kvs, which are more likely to cause oscillation than the first servo gains Kp and Kv in the actual task in step S150. The force control parameters are then adjusted based on the obtained measured force value. The situation in which oscillation is unlikely to occur in the actual task can therefore be ensured in advance by setting the second servo gains Kps and Kvs. Even inexperienced operators can therefore appropriately set force control parameters that are unlikely to cause oscillation.

In the adjustment of the force control parameters using the optimization process, the assessed values improve at least to some extent as the number of groups and the number of generations increase (see S143 to S147 in FIG. 6, as well as FIG. 13). On the other hand, increases in the number of groups for the force control parameters and the number of generations repeated for the force control parameters result in overfitting of the force control parameters to the workpieces and actions used in the adjustment of the force control parameters. For example, the fewer the number of workpieces that can be used to adjust the force control parameters, the more likely the force control parameters are to overfit to the workpieces used in the adjustment. As a result, there is a risk that force control parameters that increase the velocity of the action of the robot and are unlikely to cause oscillation are not determined in an actual task.

In the present embodiment, the situation in which oscillation is unlikely to occur in an actual task can be ensured in advance by setting the second servo gains Kps and Kvs. Therefore, even when the termination conditions appropriate enough not to cause overfitting are set, the force control parameters that are unlikely to cause oscillation can be appropriately set (see S147 in FIG. 6).

The robot control apparatus 200 in the present embodiment is also called an "adjustment apparatus". The control executor 250 is also called a "control section".

B. Second Embodiment

In the first embodiment, in the actions in steps S141 and S145 in FIG. 6, fixed values are used as the second servo gains Kps and Kvs (see upper left portion of FIG. 4). In a second embodiment, however, the plurality of measurement processes carried out in the parameter determination process are carried out by using the second servo gains used in the same feedback but having values different from each other. That is, in the parameter determination process in steps S143 to S147, the plurality of measurement processes are carried out by using the second servo gain Kps used in the position feedback but having values different from each other (see S145 in FIG. 6). Similarly, in the parameter determination process, the plurality of measurement processes are carried out by using the second servo gain Kvs used in the velocity feedback but having values different from each other (see S145 in FIG. 6). The action in step S145 in FIG. 6 will be described below. The action in step S141 is performed in the same manner.

In step S145 in FIG. 6 in the second embodiment, the processor 210 of the robot control apparatus 200 corrects the second servo gains Kps and Kvs by multiplying the second servo gains Kps and Kvs by positive coefficients Cps and Cvs, respectively, prior to each of the seven actions. The coefficients Cps and Cvs are each a random number having a probability density distribution that is a normal distribution the average of which is 1 and the standard deviation of which is 0.1. As a result, in step S145 in FIG. 6 in the second embodiment, the seven actions are performed by using the servo gain Kps having different values. Furthermore, the seven actions are performed by using the servo gain Kvs having different values. The seven actions are all performed in accordance with the same control program 224 but slightly differ from each other. FIG. 7 shows the process of correcting the second servo gains Kps and Kvs prior to each of the seven actions as "determine servo gains" enclosed with the broken line.

In the adjustment of the force control parameters using the optimization process, the assessed values improve at least to some extent as the number of groups and the number of generations increase (see S143 to S147 in FIG. 6, as well as FIG. 13). On the other hand, increases in the number of groups for the force control parameters and the number of generations repeated for the force control parameters result in overfitting of the force control parameters to the workpieces and actions used in the adjustment of the force control parameters. For example, the fewer the number of workpieces that can be used to adjust the force control parameters, the more likely the force control parameters are to overfit to the workpieces. As a result, the robot 100 may not be able to perform an action preferably in an actual task due to workpieces WK1 and WK2 having dimensional errors or the positions of the workpieces WK1 and WK2 having the dimensional errors.

In the present embodiment, however, in which the processes described above are carried out, the processes in FIG. 6 allow setting of force control parameters that are unlikely to cause oscillation and cause the robot 100 to perform an action preferably even in an actual task environment involving variations in a variety of external factors, such as dimensional errors of the workpieces WK1 and WK2 and errors in the positions where the workpieces WK1 and WK2 are placed (see S150 in FIG. 5).

C. Other Embodiments

C1. Other Embodiment 1

(1) In the embodiments described above, the robot 100 is a vertically articulated 6-axis robot including the six joints J1 to J6 (see FIG. 1). The technology of the present disclosure may instead be applied to robots having other joint mechanisms, such as horizontally articulated robots and orthogonal-coordinate-type robots.

(2) In the embodiments described above, the force detector 130 is provided at the arm flange 120 located at the front end of the arm 110 (see FIG. 1). The force detector may instead be provided at other locations, such as a joint other than the most distal joint of the robot arm, or a base of the robot arm.

(3) In the embodiments described above, the force detector 130 can detect the magnitude of forces parallel to three detection axes, the axes x, y, and z, which are perpendicular to one another in the sensor coordinate system, which is a unique coordinate system, and the magnitude of torques around the three detection axes (see FIG. 1). The force detector may instead detect a force only along a force controlling direction, or only detect a torque around an axis extending in the direction. The force detector may still instead have an aspect in which the force detector does not directly detect a force or a torque but detects a torque at a joint of the robot based, for example, on a measured value of the current flowing in the servomotor. That is, the force detector only needs to be capable of detecting a force or a torque in the direction in which the control point is controlled.

(4) In the embodiments described above, the end effector 140 is a gripper capable of holding a target object (see FIG. 1). The end effector can instead be any other type of end effector used to perform force control, such as a drill that drills holes or a screwdriver that tightens screws.

(5) The control program 224 may be generated by the robot control apparatus 200, or by a setting apparatus wired or wirelessly coupled to the robot control apparatus 200. The setting apparatus can, for example, be a personal computer with the setting program 225 installed therein (see lower portion of FIG. 2). In such an aspect, the control program generated by the setting apparatus is transmitted to the robot control apparatus 200 and stored in the robot control apparatus 200.

(6) In the embodiments described above, the force control parameters are adjusted by the robot control apparatus 200, which causes the robot 100 to perform actions through feedback control (see 250 and 270 in FIG. 2). The force control parameters may instead be adjusted by the setting apparatus wired or wirelessly coupled to the robot control apparatus 200. The setting apparatus can, for example, be a personal computer with the setting program 225 installed therein (see lower portion of FIG. 2). In such an aspect, the force control parameters 226 adjusted by the setting apparatus are transmitted to the robot control apparatus 200 and stored in the robot control apparatus 200.

(7) The control executor 250 and the parameter adjuster 270 are achieved by the processor 210 through execution of a program (see FIG. 2). Some or all of the functions of the control executor 250 and the parameter adjuster 270 may instead be achieved by a hardware circuit.

(8) In the embodiments described above, the force control parameters 226 contain the "start point" and the "end point" in each action, the "acceleration and deceleration characteristics" of the TCP in a plurality of actions, information that identifies the force control coordinate system, the "target force", and the "impedance parameter" (see FIG. 3). The force control parameters are, however, not limited to those described above and may not contain, for example, the "acceleration and deceleration characteristics".

(9) In the embodiments described above, the second servo gain Kps used to adjust the force control parameters is greater than the first servo gain Kp used in an actual task in which the force control is performed. The second servo gain Kvs used to adjust the force control parameters is greater than the first servo gain Kv used in an actual task in which the force control is performed.

In feedback control involving force control, oscillation is more likely to occur than in feedback control involving no force control due, for example, to the presence or absence of external forces caused by the presence or absence of contact between members. Therefore, in the feedback control involving force control, the servo gains are set at values smaller than those in the feedback control involving no force control. In other words, in the feedback control involving no force control, the servo gains are generally set as large as possible to the extent that no oscillation occurs in order to increase the positional accuracy of the control point and shorten the period required for an action. On the other hand, the servo gains in the feedback control involving force control are set, for example, at values that are 50% to 70% of the servo gains in the feedback control involving no force control.

The second servo gain Kps is preferably smaller than the position first servo gain used in an actual task in which positional control is performed without force control. The second servo gain Kvs is preferably smaller than the velocity first servo gain used in an actual task in which positional control is performed without force control.

(10) In the embodiments described above, the following action performed by the robot 100 in steps S141 and S145 in FIG. 6 is performed seven times. The number of actions performed by the robot to provide assessed values may instead be a smaller number, such as one, two, or three, or a larger number, such as eight or ten.

(11) In the embodiments described above, the coefficients Cps and Cvs used to generate feedback gains for respective actions are each a random number having a probability density distribution that is a normal distribution the average of which is 1 and the standard deviation of which is 0.1. The coefficients Cps and Cvs are coefficients by which original feedback gains are multiplied. The feedback gains for the respective actions may instead be generated in any other method, for example, by adding random numbers to the original feedback gains. The average and standard deviation of the random numbers can be appropriately specified in accordance with how the random numbers are used.

(12) In the embodiments described above, the optimization process using CMA-ES is carried out in step S144 (see FIGS. 6 and 7). The optimization process may instead be carried out by any other method, such as particle swarm optimization (PSO) or Bayesian optimization.

(13) In the embodiments described above, the action period OT is employed as the assessed value used in the evaluation in step S147 of FIG. 6 (see FIG. 7). The assessed value used to evaluate the process termination conditions can instead be another assessed value, such as a value produced based on the measured force value.

(14) In the embodiments described above, when the maximum value Fmax of the detected force Fd exceeds the acceptable value Flimit, and when the maximum value Tmax of the detected torque Td exceeds the acceptable value Tlimit, a penalty is imposed in the determination of the assessed value (see Expression (1) shown above). That is, the constraint conditions are imposed on the maximum value of the detected force and the maximum value of the detected torque. The constraint conditions can instead be conditions on other parameters, for example, a condition that the magnitude of the integral value of measured values over a predetermined time segment before and after a peak measured value exceeds a threshold.

(15) In the embodiments described above, the termination conditions in step S147 in FIG. 6 are that the conditions (c1) and (c2) are satisfied. The termination conditions may instead be other conditions, for example, a condition that "the condition (c1) described above is satisfied for N consecutive generations (N is an integer greater than or equal to 2)".

(16) In step S147 in the embodiments described above, it is evaluated as the evaluation of the process termination conditions whether or not the assessed value provided in step S145 has converged (see condition (c2)). The process termination conditions can instead be only a condition that the assessed value is better than a threshold specified in advance.

C2. Other Embodiment 2

In the embodiments described above, in the feedback control of the action of the robot 100, the control executor 250 performs feedback control on the position, velocity, and acceleration of the control point CP of the robot 100 (see FIG. 4). The values of the servo gain Kp in the position feedback and the servo gain Kv in the velocity feedback used in step S150 in FIG. 5 differ from the values used in step S141 in FIG. 6.

The feedback control of the action of the robot 100 can instead have an aspect in which no feedback is performed on part of the position, velocity, and acceleration, for example, an aspect in which no feedback is performed on the acceleration. That is, in the feedback control of the action of the robot 100, feedback only needs to be performed on one or more of the position, velocity, and acceleration. The second servo gains, which have values greater than the values of the first servo gains used when the robot system is caused to perform an actual task, may be feedback servo gains of one or more of the position, velocity, and acceleration.

C3. Other Embodiment 3

In the second embodiment, the plurality of measurement processes carried out in the parameter determination process are carried out by using the second servo gains used in the same feedback but having values different from each other. The plurality of measurement processes carried out in the parameter determination process may instead be carried out by using second servo gains having a fixed value, as in the first embodiment. Still instead, some of the feedback servo gains may have different values on a measurement process basis, and the other feedback servo gains may have a fixed value.

D. Still Another Embodiment

The present disclosure is not limited to the embodiments, examples, and variations described above and can be achieved in a variety of configurations to the extent that they do not depart from the substance of the present disclosure. For example, the technical features described in the embodiments, examples, and variations and corresponding to the technical features in the aspects described in the section of Summary can be replaced with other features or combined with each other as appropriate to solve part or entirety of the problems described above or achieve part or entirety of the effects described above. Furthermore, when any of the technical features has not been described as an essential feature in the present specification, the technical feature can be deleted as appropriate.

(1) According to an aspect of the present disclosure, there is provided a method for adjusting a force control parameter used in force control performed by a robot system. The robot system includes a robot, a force detector configured to measure an external force exerted on the robot, and a control section that causes the robot to perform an action through feedback control. The adjustment method includes a measurement step of producing a measured force value that is a measured value of the external force by causing the robot to perform an action using one or more second servo gains corresponding to one or more first servo gains used by the control section when the robot system is caused to perform an actual task, the second servo gains each having a value greater than the value of the corresponding first servo gain, and further using a candidate value of the force control parameter, a parameter update step of producing a new candidate value of the force control parameter by carrying out an optimization process on the force control parameter by using the measured force value, and a parameter determination step of determining the force control parameter used in the force control performed by the robot system by repeating the measurement step and the parameter update step.

In the present embodiment, in the adjustment of the force control parameter, the robot is caused to perform an action by using the second servo gains, which are more likely to cause oscillation than the first servo gains in the actual task, and the force control parameter is adjusted based on the measured force value produced in the action. The situation in which oscillation is unlikely to occur in the actual task can therefore be ensured in advance by setting the second servo gains. Even inexperienced operators can therefore appropriately set a force control parameter that is unlikely to cause oscillation.

(2) In the adjustment method according to the aspect described above, the control section may perform the feedback control on the position and velocity of a control point of the robot, and the second servo gain may include at least one of a servo gain in feedback of the position and a servo gain in feedback of the velocity.

The aspect described above allows even inexperienced operators to appropriately set a force control parameter that is unlikely to cause oscillation resulting from position and velocity command values in the feedback control of the robot.

(3) In the adjustment method according to the aspect described above, the plurality of measurement steps carried out in the parameter determination step may include the plurality of measurement steps carried out by using the second servo gains used in the same feedback but having values different from each other.

The aspect described above allows a force control parameter that is unlikely to cause oscillation to be set even in an actual task environment involving variations in a variety of external factors.

(4) According to another aspect of the present disclosure, there is provided an adjustment apparatus that adjusts a force control parameter used in force control performed by a robot system including a robot, a force detector configured to measure an external force exerted on the robot, and a control section that causes the robot to perform an action through feedback control. The adjustment apparatus includes a measurement section that carries out a measurement process of producing a measured force value that is a measured value of the external force by causing the robot to perform an action using one or more second servo gains corresponding to one or more first servo gains used by the control section when the robot system is caused to perform an actual task, the second servo gains each having a value greater than the value of the corresponding first servo gain, and further using a candidate value of the force control parameter, a parameter update section that carries out a parameter update process of producing a new candidate value of the force control parameter by carrying out an optimization process on the force control parameter by using the measured force value, and a parameter determination section that carries out a parameter determination process of determining the force control parameter used in the force control performed by the robot system by repeating the measurement process and the parameter update process.

(5) In the adjustment apparatus according to the aspect described above, the control section may perform the feedback control on the position and velocity of a control point of the robot, and the second servo gain includes at least one of a servo gain in feedback of the position and a servo gain in feedback of the velocity.

(6) In the adjustment apparatus according to the aspect described above, in the parameter determination process, the parameter determination section may carry out the plurality of measurement processes by using the second servo gains used in the same feedback but having values different from each other.

The present disclosure can also be achieved in a variety of aspects other than the force control parameter adjustment method and the force control parameter adjustment apparatus. For example, the present disclosure can be achieved in the form of a robot setting method and a robot controlling method, a computer program that achieves the methods, and a non-transitory recording medium and other media on which the computer program is recorded.

What is claimed is:

1. A method for adjusting one or more force control parameters used in force control performed by a robot system,
the robot system including a robot and a force detector configured to measure an external force exerted on the robot,
the adjustment method for causing a processor to execute a process, the method comprising executing on the processor the steps of:
a measurement step of producing measured force information of the external force by causing the robot to perform an action using one or more second servo gains used to adjust the force control parameters corresponding to one or more first servo gains when the robot system is caused to perform a task which is different from the adjustment of the force control parameters, the second servo gains each having a value greater than a value of the corresponding first servo gain, and further using a candidate value of the force control parameters, the measured force information including an action period of time during which the action is performed, a maximum detected force value of the external force, and a maximum detected torque value of the external force;
a parameter update step of producing a new candidate value of the force control parameters by carrying out an optimization process on the force control parameters by using the measured force information; and
a parameter determination step of determining the force control parameters used in the force control performed by the robot system by repeating the measurement step and the parameter update step.

2. The method for adjusting one or more force control parameters according to claim 1,
wherein the processor is further configured to perform feedback control on a position and a velocity of a control point of the robot, and
the second servo gain includes at least one of a servo gain in feedback of the position and a servo gain in feedback of the velocity.

3. The method for adjusting one or more force control parameters according to claim 1,
wherein a plurality of the measurement steps carried out in the parameter determination step include a process in which the second servo gains are used in the same feedback but having values different from each other.

4. An adjustment apparatus that adjusts one or more force control parameters used in force control performed by a robot system including a robot and a force detector configured to measure an external force exerted on the robot, the adjustment apparatus comprising:
a memory configured to store a program; and
a processor configured to execute the program so as to:
produce measured force information of the external force by causing the robot to perform an action using one or more second servo gains used to adjust the force control parameters corresponding to one or more first servo gains when the robot system is caused to perform a task which is different from the adjustment of the force control parameters, the second servo gains each having a value greater than a value of the corresponding first servo gain, and further using a candidate value of the force control parameters, the measured force information including an action period of time during which the action is performed, a maximum detected force value of the external force, and a maximum detected torque value of the external force;
produce a new candidate value of the force control parameters by carrying out an optimization process on the force control parameters by using the measured force information; and
determine the force control parameters used in the force control performed by the robot system by repeating the production of the measured force information and the production of the new candidate value.

5. The adjustment apparatus according to claim 4,
wherein the processor is further configured to perform feedback control on a position and a velocity of a control point of the robot, and
the second servo gain includes at least one of a servo gain in feedback of the position and a servo gain in feedback of the velocity.

6. The adjustment apparatus according to claim 4,
wherein a plurality of the productions of the measured force information carries out in the determination of the force control parameters include a state in which the second servo gains are used in the same feedback but having values different from each other.

\* \* \* \* \*